US010651976B2

(12) United States Patent
Bruhn et al.

(10) Patent No.: US 10,651,976 B2
(45) Date of Patent: May 12, 2020

(54) METHOD AND APPARATUS FOR REMOVING JITTER IN AUDIO DATA TRANSMISSION

(71) Applicant: TELEFONAKTIEBOLAGET LM ERICSSON (PUBL), Stockholm (SE)

(72) Inventors: Stefan Bruhn, Sollentuna (SE); Tomas Frankkila, Luleå (SE); Karl Hellwig, Wonfurt (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/035,316

(22) Filed: Jul. 13, 2018

(65) Prior Publication Data

US 2018/0343086 A1 Nov. 29, 2018

Related U.S. Application Data

(62) Division of application No. 15/542,232, filed as application No. PCT/EP2016/071817 on Sep. 15, 2016, now Pat. No. 10,148,391.

(Continued)

(51) Int. Cl.
H04L 1/00 (2006.01)
G10L 19/00 (2013.01)
(Continued)

(52) U.S. Cl.
CPC .......... H04L 1/0082 (2013.01); G10L 19/00 (2013.01); H04L 1/0045 (2013.01); H04L 1/08 (2013.01); H04L 49/90 (2013.01); H04L 65/608 (2013.01)

(58) Field of Classification Search
CPC .................. H04L 1/0082; G10L 19/00
See application file for complete search history.

(56) References Cited

U.S. PATENT DOCUMENTS 5,208,816 A * 5/1993 Seshardi ............... H03M 13/39
714/795
2003/0112758 A1 6/2003 Pang et al.
(Continued)

FOREIGN PATENT DOCUMENTS

WO 2007073328 A2 6/2007

OTHER PUBLICATIONS

International Search Report and Written Opinion issued in Application No. PCT/EP2016/071817 dated Dec. 22, 2016, 10 pages.
(Continued)

Primary Examiner — Joseph D Torres
(74) Attorney, Agent, or Firm — Rothwell, Figg, Ernst & Manbeck, P.C.

(57) ABSTRACT

In accordance with an example embodiment of the present invention, disclosed is a method and an apparatus thereof for removing jitter introduced by a packet switched network. Each received audio frame comprises a primary portion and a redundancy portion. The redundancy portion comprises a partial redundant copy of a previous frame that is offset by k frames. If a frame n is lost, a frame n+k that comprises the partial redundant copy of the lost frame n, is located in a jitter buffer. Based on the frame n+k, a substitute frame n' substituting the lost frame n is created and a substitution indicator of the substitute frame n' is set to indicate that the redundancy portion of the substitute fame n' should be used in decoding.

16 Claims, 7 Drawing Sheets

Related U.S. Application Data

(60) Provisional application No. 62/235,737, filed on Oct. 1, 2015.

(51) Int. Cl.
*H04L 1/08* (2006.01)
*H04L 12/861* (2013.01)
*H04L 29/06* (2006.01)

(56) References Cited

U.S. PATENT DOCUMENTS

| | | | | |
|---|---|---|---|---|
| 2005/0060143 | A1* | 3/2005 | Ehara | G10L 19/005 704/201 |
| 2005/0228651 | A1* | 10/2005 | Wang | G10L 19/08 704/207 |
| 2007/0147314 | A1* | 6/2007 | Taleb | H04L 1/0041 370/338 |
| 2012/0265523 | A1* | 10/2012 | Greer | G10L 19/24 704/201 |
| 2016/0308791 | A1* | 10/2016 | Subasingha | H04L 12/56 |
| 2017/0337925 | A1* | 11/2017 | Greer | G10L 19/24 |

OTHER PUBLICATIONS

Yao, J. et al: "Experiment with error-correcting RTP gateways", Multimedia Signal Processing, 199 IEEE 3rd Workshop on Copenhagen, Denmark; Piscataway, NJ, USA, IEEE, US, XP010351763, Sep. 13, 1999, 6 pages.

Sjoberg, J. et al: "RTP Payload Format and File Storage Format for the Adaptive Multi-Rate (AMR) and Adaptive Multi-Rate Wideband (AMR-WB)", Audio Codecs, Network Working Group, Standards Track, Apr. 2007, 59 pages.

3GPP TS 26.448 version 12.1.0 , 3rd Generation Partnership Project; Technical Specification Group Services and System Aspects; Codec for Enhanced Voice Services (EVS); Jitter Buffer Management, Release 12, Dec. 2014, 22 pages.

3GPP TS 33.445 version 12.2.1 Release 12, "AMR-WB-interoperable modes", Apr. 2015, pp. 445-451.

3GPP TS 33.445 version 12.2.1 Release 12, "AMR-WB-interoperable modes", Apr. 2015, pp. 602-652.

* cited by examiner

METHOD AND APPARATUS FOR REMOVING JITTER IN AUDIO DATA TRANSMISSION

CROSS REFERENCE TO RELATED APPLICATIONS

This application is a divisional of U.S. application Ser. No. 15/542,232, which has a § 371(c) date of Jul. 7, 2017 and which is the U.S. National Stage of International Patent Application No. PCT/EP2016/071817, filed Sep. 15, 2016, which designated the United States and claims priority to U.S. provisional application No. 62/235,737, filed on Oct. 1, 2015. The above identified applications are incorporated by this reference.

TECHNICAL FIELD

The present application relates generally to audio data transmission, and in particular to methods and apparatuses for removing delay jitter introduced by a packet switched network.

BACKGROUND

The new 3GPP EVS codec was originally standardized for Enhanced Voice Services (EVS) in the Evolved Packet System (EPS) with LTE (Long Term Evolution) access, i.e. for application in an IP environment and with the IMS (IP Multimedia Subsystem) as Application Core Network. This means that the speech data is transmitted in IP packets. The transmission of the packets is prone to delay jitter and packet loss. The EVS encoder operates like many other speech and audio codecs on signal frames of 20 ms length and generates a set of coded parameters for each frame. These parameter sets are also referred to as coded speech or data frames. The EVS decoder expects to receive these frames at the same rate of one set each 20 ms and then decodes them to the reconstructed output signal. Input and output signals to the encoder and from the decoder are 16 bit linear PCM (Pulse Code Modulation) encoded waveforms, sampled at 8, 16, 32 or 48 kHz.

The transmission of the speech data packets in a packet-switched (PS) system like the EPS using the RTP/UDP/IP (Real-time Transport Protocol/User Datagram Protocol/Internet Protocol) protocols means that the packets (each containing one or several coded speech frames) may arrive at a receiver asynchronously, i.e. at irregular time instances. This is especially the case in the LTE radio access network, but also in other access networks, like WiFi. An essential receiver component is hence a de-jitter buffer (often referred to as jitter buffer) that accepts the asynchronously arriving packets, stores them or the contained speech data frames, and conveys them at regular time intervals to a synchronously operating decoder. The decoder may for instance be the EVS decoder that requires speech data frames at a constant frame rate of 20 ms. Depending on the amount of delay jitter, the depth of the jitter buffer needs to be chosen such large to ensure that even speech frames arriving late can still be propagated to the speech decoder at the time instant when they are needed. On the other hand, the jitter buffer depth should be as small as possible in order to keep the speech path delay as short as possible, i.e. the speech delay from sending end to the receiving end. The longer the speech path delay in a speech conversation, the more the conversational quality will be affected. If the jitter buffer depth is too small, the likelihood increases that a coded speech frame is not available when it needs to be provided to the speech decoder. Hence, such frames are effectively lost and are correspondingly signaled as lost or erased frames to the decoder. The decoder then applies frame loss concealment, meaning that an artificial frame for the lost speech frame is generated such that the loss is as inaudible as possible. If the late speech frame, declared as lost, arrives then at a later point in time it is usually discarded, but may also at the next frame instant be conveyed to the decoder for decoding (then the jitter buffer contents and the speech path delay increases by this frame).

It is to be noted that jitter buffers may also be deployed in network nodes with incoming packet-switched connections and outgoing connections that can either be circuit-switched (CS) or PS. The purpose is in any case the de-jittering of the asynchronously arriving data.

Jitter buffers may typically operate on frames. When the frames are arriving in packets they are first de-packetized and then the frames are placed into the jitter buffer at their proper time positions, according to their time stamps. If several frames are contained in a packet (which is a possibility with, e.g., the RTP payload format of the EVS codec according to 3GPP TS 26.445, Annex A), the time stamp of the RTP header apply only to the first frame contained in the packet. In that case the respective time stamps of the other included frames are then obtained by analyzing the RTP payload (i.e. the frames included in the packet). If the outgoing connection is also PS using RTP/UDP/IP, the frames taken out of the jitter buffer will be re-packetized. A jitter buffer may also operate based on RTP packets rather than on frames, especially in case of an outgoing PS connection.

Packet delay jitter is generally not the only cause of frame loss. Wireless transmission systems in particular, but even wireline systems may be prone to transmission errors. In transmissions using the RTP/UPD/IP protocols, packets affected by detectable errors are usually discarded. Likewise, there may be many other reasons why RTP/UPD/IP packets may not arrive at the receiver or do not arrive in time. In any case, in general the frames contained in such packets are lost and the jitter buffer may signal to the decoder that the corresponding frames are lost.

Frame loss concealment is only one technique to mitigate effects of frame loss. Another is to use forward error correction (FEC), which in a very general sense means adding redundancy to the transmitted information that allows the receiver to recover lost information or at least a part of it. In packet-based transmission systems using RTP/UPD/IP protocols application layer FEC is a known technique. One such technique is redundancy transmission in which a frame transmitted with one packet is re-transmitted within another packet. Hence, if the packet containing the primary frame data is lost, there is still possibility that the receiver gets a redundant copy of this data with another packet. In many realizations of redundancy transmission each packet contains a primary frame and the redundant copy of the data of an earlier frame. In case the packet with the primary frame gets lost but the jitter buffer in the receiver gets the equivalent redundant copy of the frame before it needs to be provided to the decoder, the loss will not have an effect. Partial redundancy is another flavor of redundancy transmission in which only the most important parameters (a part of all parameters) are sent in another packet, allowing the receiver to recover the lost frame in a better way.

The EVS codec standard comprises a complete RTP transmission frame work, including a jitter buffer management system and specifications for the RTP payload format.

The decoder comprises an advanced frame loss concealment system. The EVS codec itself comprises a large number of operating modes, at various bit rates from 5.9 kbps (variable bit rate) to 128 kbps, and a multitude of audio bandwidth modes comprising narrowband (NB), wideband (WB), super-wideband (SWB) and fullband (FB).

A special feature of the EVS codec is its "channel-aware" operation mode (CA mode). In short, the CA mode is sending a partial redundant copy of the frame some packets later. It is described in sections 5.8.1 and 5.8.2 of specification 3GPP TS 26.445.

The operation of the CA mode is further explained with FIG. 1. FIG. 1 shows a sequence of received frames 10, where frame n 10a is due for decoding but is unavailable. Frames n+1 to n+5 have arrived and are queued in the jitter buffer. Each frame contains a primary portion 11 and a redundancy portion 13 for a previous frame that is displaced by the FEC offset. The FEC offset is provided as "RF frame offset" parameter 15 in each frame (RF=3 in the example). This parameter indicates the frame for which the redundancy portion is valid by means of displacement relative to the frame containing the redundancy. Hence, frame n+3 contains the partial redundant copy of the lost frame n, as indicated by RF=3.

The CA mode of the EVS codec can send the partial redundancy with 2, 3, 5 or 7 frames offset, i.e. 40, 60, 100 or 140 ms after the primary frame. The offset can be adapted such that when the packet loss rate is zero or low then no partial redundancy is sent, when the packet loss rate is higher but the losses occur mainly as single losses or few losses in a row then a short offset is used, for example offset 2 or 3, and when the packet loss rate is high and long loss bursts are detected then the offset is increased, e.g. to 5 or 7.

Using no partial redundancy or partial redundancy with a small offset allows for maintaining a short end-to-end delay when the operating conditions are good. However, as described above, this is useful only if the losses are well spread out over time. If long loss burst would occur, then the short offsets become unusable since both the primary encoding and the partial redundancy would be lost.

The longer offsets allow for maintaining good quality during periods with long loss bursts. However, the end-to-end delay will increase significantly. These offsets should therefore only be used when really needed. Otherwise, this would have a significant impact on the conversational quality.

To make the CA mode adaptive, the receiver evaluates the packet losses in the received media and decides if partial redundancy should be used and with which offset. The receiver then sends a Codec Mode Request (CMR) back to the sender, which changes the encoding to enable or disable the partial redundancy encoding and/or changes the offset as requested. This means that it takes (at least) a round-trip time before the receiver starts receiving packets according to the CMR that it sent.

A relevant description of the signaling parameters of the EVS CA mode is found in 3GPP TS 26.445. In particular, the coding of the FEC offset parameter (RF parameter) is detailed in the parts of the specification pertaining to the CA mode.

While the EVS codec has originally been standardized for packet-switched (PS) transmission systems, there are now standardization efforts ongoing targeting applications of the EVS codec in circuit-switched (CS) radio access systems, specifically UTRAN (UMTS Terrestrial Radio Access Network). The transmission in these CS radio access systems (as opposed to PS systems) is synchronous, i.e. coded speech frames are transmitted according to the 20 ms frame clock. As a consequence, coded speech frames arrive at the receiving end of the radio access without delay jitter and hence there is no need to use a jitter buffer in CS user equipments (UEs).

The fact that a CS radio access system transmits exactly at regular time intervals of e.g. 20 ms creates problems when receiving frames from a PS System in RTP packets with substantial delay jitter. According to the existing solution a jitter buffer is inserted in a network node (e.g. media gateway) between PS and CS systems. With the help of the jitter buffer, this network node propagates the available frames in a synchronous stream to the CS system. If a frame is lost, i.e. not present in the jitter buffer, when a sending time for the frame has come, then typically nothing is sent to the CS System, and the CS UE performs error concealment. This is also the case when the redundant secondary information is already inside the jitter buffer. One problem is that existing solutions do not and cannot take advantage of the CA Mode in this jitter buffer. The frames are just forwarded, with primary and (delayed) secondary information, to the CS system, but the secondary information, i.e. the redundancy portion, is not used.

The fact that an existing CS UE does not see delay jitter on its radio access means that it does not need a jitter buffer, and hence a jitter buffer is generally not implemented and not available in a CS UE. The term "CS UE" could refer to a UE that is not capable of PS radio access, but could also refer to a functionality for CS of a UE which is capable of both CS and PS radio access. In a CS UE, coded speech frames are typically decoded within less time than the duration of a frame (e.g. in less than 20 ms in case of EVS) after reception, to keep the speech path delay small. The consequence when using the EVS CA mode is that the partial redundancy data of the received speech frames will be useless in the CS UE, since the partial redundancy arrives too late to be useful for decoding. If, for instance, the CA mode is operated with a FEC offset of 3, then the partial redundant copy would arrive 3 frames (i.e. 60 ms) after the primary data needs to be provided to the decoder. Hence, the partial redundant copy is not of any use and the purpose of the CA mode to increase the robustness against frame loss cannot be achieved. On the contrary, transmission resources are wasted for the unusable partial redundant copies.

Another problem occurs e.g. in a transcoding-free interconnect scenario between a 4G-UE (UE A) 200 residing in PS domain 220 (e.g. with LTE access) and a 3G-UE (UE B) 201 residing in CS domain 230. This scenario is shown in FIG. 2. The PS (IMS) domain 220 is terminated by ATGW (Access Transfer Gateway) A 202 (user plane (UP)) and ATCF (Access Transfer Control Function) A 203 (control plane). The UP data (coded EVS frames) contained in RTP/UPD/IP packets sent from 4G-UE, denoted "UE A" 200 in FIG. 2, will arrive at ATGW A 202 with possible delay jitter and loss. The ATGW A 202 propagates or forwards the packets to MGW (Media Gateway) B 204 residing in the CS Core network. Transmission from MGW B 204 onwards towards 3G-base station "nodeB" B (NB B) 205 in CS is using a synchronous Iu user plane protocol. The transmission between ATGW A 202 and MGW B 204 and any further node that may be in the speech path is typically PS-based, but may also be CS. Any of these nodes may comprise a de-jitter buffer and at least the last node, from which onwards a synchronous transmission protocol is used, has to comprise a de-jitter buffer to provide the regular, synchronous flow for the CS domain.

A problem occurs when using the CA mode in the call direction from 4G-UE A 200 to 3G-UE B 201 and may be explained by an example where the MGW B 204 performs de-jitter buffering. In case frame n is unavailable, e.g. lost or too late, when it is due for transmission on the synchronous interface, a Jitter Buffer Management (JBM) method would either not transmit any frame at all, or indicate a NO_DATA frame, or possibly repeat the previously received frame, or apply more sophisticated techniques to construct a valid speech frame from previously received frames. The decoder in the 3G-UE B 201 would either decode the frame, if it is a repeated previous frame or any valid speech frame, or it might generate an artificial frame using its frame loss concealment techniques. The frame containing the partial redundant copy arriving after the FEC offset time period would in any case be useless, and hence the situation would be as described above; the purpose of the CA mode to increase the robustness against frame loss cannot be achieved. Rather, the transmission resources used for the unusable partial redundant copies are wasted. The same problem occurs even if other jitter buffers in the speech path would replace unavailable frames (packets) by NO_DATA frames or repetition frames or by packets containing such frames.

FIG. 3 illustrates another problem that occurs in case a JBM in a network node inserts or removes frames in order to re-adjust the depth. This may happen in case of buffer overflow or underrun, respectively. An underrun, for instance, may cause the insertion of frame "i" 30 by the JBM. The consequence of this is that the FEC offset, indicated by the RF frame offset parameter included in the CA mode frames may become incorrect. The RF frame offset parameter becomes incorrect for all frames after the inserted frame, whose partial redundant copy is valid for a frame before the inserted frame. The analogue problem occurs in case of a frame deletion. The consequence of an incorrect FEC offset may be degraded quality when decoding a frame by using the partial redundant copy. This is since the partial redundant data are not valid for the frame for which they are decoded.

SUMMARY

It is an aim of the various embodiments to compensate frame loss and delay jitter in audio data transmission.

According to an embodiment, there is a method for removing jitter introduced by a packet switched network. The method comprises receiving audio frames and storing the received audio frames into a jitter buffer. Each frame comprises a primary portion and a redundancy portion, wherein the redundancy portion comprises a partial redundant copy of a previous frame that is offset by k frames. The method further comprises determining that a frame n is lost and locating in the jitter buffer a frame n+k that comprises the partial redundant copy of the lost frame n. Based on the frame n+k, a substitute frame n' substituting the lost frame n is created and a substitution indicator of the substitute frame n' is set to indicate that the redundancy portion of the substitute fame n' should be used in decoding. The substitute frame n' is then provided for transmission.

According to another embodiment there is a method for obtaining audio frames from a circuit-switched communication link for decoding. The method comprises receiving an audio frame and checking if a substitution indicator of the audio frame is set. If the substitution indicator is set, a redundancy portion of the audio frame is provided to a decoder for decoding. If the substitution indicator is not set, a primary portion of the audio frame is provided to a decoder for decoding.

According to yet another embodiment there is an apparatus comprising a jitter buffer, a processor and a memory, the memory containing instructions executable by the processor. The apparatus is operative to receive audio frames and store received audio frames into the jitter buffer. Each frame comprising a primary portion and a redundancy portion, wherein the redundancy portion comprises a partial redundant copy of a previous frame that is offset by k frames. The apparatus is further operative to determine that a frame n is lost and to locate in the jitter buffer a frame n+k that comprises the partial redundant copy of the lost frame n. The apparatus is operative to create based on the frame n+k, a substitute frame n' substituting the lost frame n and to set a substitution indicator of the substitute frame n' to indicate that the redundancy portion of the substitute fame n' should be used in decoding. The apparatus is further operative to provide the substitute frame n' for transmission.

According to yet another embodiment there is an apparatus comprising a processor and a memory, the memory containing instructions executable by the processor. The apparatus is operative to receive an audio frame and check if a substitution indicator of the audio frame is set. The apparatus is further operative to provide a redundancy portion of the audio frame to a decoder for decoding if the substitution indicator is set; and to provide a primary portion of the audio frame to a decoder for decoding if the substitution indicator is not set.

According to a further embodiment there is a computer program, comprising instructions which, when executed by a processor, cause an apparatus to store received audio frames into the jitter buffer and to determine that a frame n is lost. To locate in the jitter buffer a frame n+k that comprises the partial redundant copy of the lost frame n and create based on the frame n+k, a substitute frame n' substituting the lost frame n, and to set a substitution indicator of the substitute frame n' to indicate that the redundancy portion of the substitute fame n' should be used in decoding.

According another further embodiment there is a computer program, comprising instructions which, when executed by a processor, cause an apparatus to check if a substitution indicator of a received audio frame is set and to provide a redundancy portion of the audio frame to a decoder for decoding if the substitution indicator is set; and to provide a primary portion of the audio frame to a decoder for decoding if the substitution indicator is not set.

BRIEF DESCRIPTION OF THE DRAWINGS

For a more complete understanding of example embodiments of the present invention, reference is now made to the following description taken in connection with the accompanying drawings in which.

DETAILED DESCRIPTION

Figure 1:
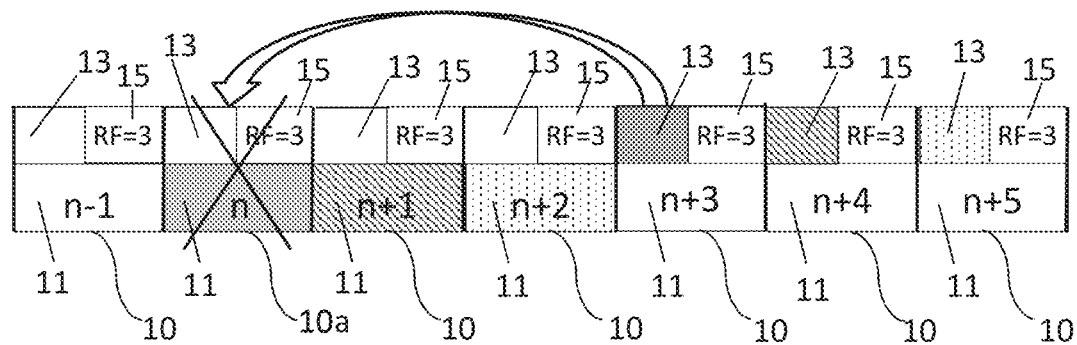
FIG. 1 illustrates the operation of the CA mode.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

An exemplifying embodiment applicable e.g. for a network node associated with or comprising a jitter buffer is an EVS-specific extension of the jitter buffer functionality, tailor made for the CA mode.

The exemplifying embodiment comprises: When a frame n is unavailable for transmission, i.e. lost somehow, and when the partial redundant copy of that frame is available in the jitter buffer, then a "substitution frame" may be obtained or generated e.g. by the jitter buffer functionality of the network node. The substitution frame could alternatively be denoted something else. The substitution frame may be generated based on the speech data frame containing the partial redundancy, and will thus be based on information closely related to the unavailable frame. This substitution frame may then be provided or sent to the 3G-UE for decoding, instead of the unavailable lost speech data frame. However, it may be necessary to indicate to the EVS speech decoder that the redundancy portion of the frame, rather than the primary portion of the frame needs to be decoded. In other words, it may be necessary to indicate to the 3G-UE that it should not care about the primary part or portion of the frame (since it is not this part that is of interest here), but only about the redundancy portion. To this end, a "substitution indicator" may be defined, which is a signaling mechanism, using e.g. some available bits of the frame or RTP packet. The decoder of the 3G-UE may then check this substitution indicator in the received frame, before decoding, to see whether the primary or the redundancy portion of the obtained frame should be used for decoding, and then the frame may be decoded in accordance with the information conveyed by the substitution indicator, i.e. the correct part of the frame may be decoded.

Several ways are possible to define the substitution indicator. One extremely robust method is to replace all bits of the not needed portion of the substitution frame by a fixed bit pattern, called here "CA-CodeWord".

Exemplifying benefits with the embodiment described above are that the EVS CA mode becomes useful even if the decoder resides in an entity in the CS domain (UE). Quality degradations due to frame losses in the call path prior to the node that inserts the substitution frames according to the invention are mitigated. This gain can in many cases be achieved with no extra delay on top of the delay introduced by the jitter buffer that is in any case necessary when converting an asynchronous stream of EVS packets to a synchronous stream of EVS frames that are conveyed to a receiving entity in CS domain.

A second exemplifying embodiment for a node operated in CS domain, decoding the EVS speech data frames and particularly for a 3G-UE is to delay the decoding of received frames by the redundancy offset, i.e. by adding a receiver buffer within the node or the UE. If then frame n is not available for decoding or is marked as a bad frame (e.g. bad due to errors on the 3G downlink radio interface), unusable for decoding, and if instead the frame (n+offset) containing the partial redundant copy of that frame n has been received without error, then that redundant copy is fed to the EVS decoder for reconstruction and decoding of the lost/bad frame n.

A simple solution to ensure that the partial redundancy can be used as often as possible would be to always use receiver buffer corresponding to the maximum offset. However, the price for this is a longer speech path delay for all calls, even if no partial redundancy or partial redundancy with a short offset would be used.

An alternative solution is therefore to make the receiver buffer adaptive such that the number of buffered frames matches the offset being used, even when the offset changes and when the usage of partial redundancy is enabled/disabled. This can be done by monitoring the offset being used in the received frames. Since the receiver buffer adapts to the CA mode usage and the offset detected in the received frames, this mode can be called "reactive mode". This "reactive mode" is better than using a fixed receiver buffer because it gives good quality and short delay when the operating conditions are good and also because it can adapt to a more robust mode when the frame loss rate increases and/or when loss bursts occur. However, if frame losses occur when the offset is being increased then the partial redundancy information will not be available in the receiver buffer.

The decoder also needs to decode a frame every 20 ms. If the number of buffered frames needs to be increased, then a dummy frame needs to be sent to the decoder instead of a real received frame. This is similar to inserting a frame loss. It is well known that different frame types have different sensitivity for frame losses because the error concealment works well for some frame types but not as well for other frame types. For example, if a frame loss occurs during stationary voiced or unvoiced speech then the error concealment can typically conceal the loss quite well. But if a frame loss occurs for an onset frame or non-stationary frames then the error concealment is typically less successful in concealing the lost frame. This means that it can be unsuitable to change the number of buffered frames immediately when a change in the offset is detected in the received frames. The adaptation of the receiver buffer should thus be delayed until a dummy frame can be inserted with no or little quality impact. However, this means that there will be a period when the partial redundancy would not be available in the receiver buffer in case a frame loss occurs.

Yet another solution is therefore to adapt the receiver buffer when the CMR is sent to request enabling of the CA mode or to request a different offset. Since it takes a round-trip time from sending the CMR until the CA mode usage or the new offset is used in the received media, the receiver should have sufficient amount of time to adapt the receiver buffer, i.e. add dummy frame(s) or drop received frame(s), while still giving no or only little impact on the quality. Since the receiver buffer adapts before the CA mode is enabled or disabled, or before the offset is changed, then this mode can be called "pro-active mode".

It is however also possible that network nodes in the path change the CMR without informing the entity that sent the original CMR feedback to enable/disable CA mode or to change the offset. For example, if the CS UE sent a CMR to request that CA mode is enabled with an offset of 2 then an MGW in the feedback path may change the CMR to instead request that the CA mode is enabled with an offset of 5. In this case, the CS UE does not receive any information that the CMR has been changed. To handle such cases, the "re-active mode" and the "pro-active mode" should be combined into a solution that both analyzes the CA mode usage in the received frames and also uses the sent CMR to trigger the adaptation of the receiver buffer.

There are also other possibilities to trigger the adaptation of the receiver buffer. For example, the node or 3G-UE may decide, based on the detected frame error rate and/or detected loss burst lengths, whether or not the added delay is paying off, i.e. the receiving node or UE may decide to add or remove the extra buffer or to adapt the number of frames that are being buffered.

Part of this solution is the EVS CA-CMR signaling for adaptation that is based on the quality of the perceived transmission channel. A detector inside the node or 3G-UE receiver estimates the received transmission channel quality, e.g. based on measurements of the frame loss rate, loss burst length, radio interference or other criteria. If a good channel is detected, with no or few frame losses, then the decoding of received frames is not delayed, minimizing the speech path delay. If a bad channel is detected, then the decoding of the received frames is delayed by the redundancy offset. If a node or 3G-UE decides that the extra buffer does not pay off, then it should consequently also send a CA-CMR signal back to switch the redundancy off in the remote sender. Otherwise the redundancy is sent, but is useless and hence does only waste transmission resources.

An advantage with the second embodiment is that the network can be unaware of how the CA mode is used by the end-points. Even the jitter buffer in an MGW does not need to be aware of the CA mode. This means that this solution can be used in legacy networks where no EVS-specific jitter buffer is implemented in the MGW.

Another advantage with the second embodiment is that it makes the CA mode useful also when frame losses, including long loss bursts, occur in the CS radio access.

Both above described embodiments may coexist, provided the CA-adaptation signaling is configured for taking that into account.

In the case of coexisting solutions, i.e. the first and second embodiments described above, first, the adaptive jitter buffer in some MGW within the PS-network domain is removing the jitter coming from the 4G-access, and provides the substitution frames in case of 4G-lost frames, as described above, sending these primary and/or substitution frames over the CS access to the 3G-UE. This first step does not necessarily add more delay to the speech path than the jitter buffer needs anyway. Lost primary frames are replaced by the secondary information, e.g. by the complete frame comprising the partial redundant copy of the lost frame in a redundancy portion. In all cases, the big majority of frames are not lost, and where the frame is not lost, it is conveyed to the 3G-UE containing the primary portion and the delayed redundancy portion "as usual", i.e. without a signal being set to indicating that the 3G-UE should decode the redundancy portion of the frame.

The second step, executed in the receiving 3G-UE, is then only necessary, when, in addition, also the 3G radio channel is bad, i.e. has a high frame loss rate. Then the 3G-UE may, as remedy, add a fixed or adaptive receiver buffer, corresponding to either the maximum CA-offset or to the actually used CA-offset and may deploy the received redundant information in the EVS decoder.

Since the frame loss rates on 4G and 3G are typically well below 10% and independent of each other on these different accesses, it is unlikely that these frame losses and their concealment interfere with each other negatively. The likelihood is small that e.g. one 4G frame n is lost and on 3G the same frame is lost again. Even if it would occur, according to the third aspect of the solution, the 3G-UE could still use the secondary information from a frame received FEC-offset frames later. Only if also this secondary information is lost on 3G, then the frame is really lost. This occurs with negligible likelihood.

CA-Adaptation Signaling in this combined solution is explained next. The final receiver, which is the 3G-UE in this scenario, estimates its local 3G-radio link quality and sends CA-adaptation signals back. It may indicate, e.g. with CA-CMR, whether or not redundancy, as described above, is wanted, and which offset (e.g. in number of frames) is most suitable. These CA-CMR signals may then be received by, or otherwise be provided to and obtained by, the node or functional unit, exemplified herein by an MGW, in the path that handles the jitter buffer of the 4G access according to an embodiment described above. This MGW may also have a quality-estimator for its receive link (mainly the 4G radio) and may combine the CA-signaling from the 3G-UE with its own estimated CA-signaling, e.g. its own estimated need for redundancy, and may then provide/send the combined CA-CMR signaling back to the 4G-UE. If none of the receivers needs CA redundancy, then such redundancy may be switched off, and thus save transmission resources. When only one or both of the 3G-UE and the MGW need it, then the stronger requirement may be considered. The media-sending 4G-UE may not notice that it gets a combined CA-CMR, i.e. it may be unaware of that it is a combined CA-CMR, since it may appear identical to another type of CA-CMR.

The advantages with the third embodiment, i.e. the combination of the first and the second embodiment are that the CA mode is useful even when the UE (temporarily) only operates with a short receiver buffer. In addition, it allows operating the second embodiment selectively only when the CS link (3G radio channel) is bad but to turn it off when the CS link is good.

A further exemplifying embodiment relates to a problem that occurs in case a JBM in a network node inserts or removes frames in order to re-adjust the jitter buffer depth. The solution is to detect an insertion or deletion condition and to modify the RF frame offset parameter of the frames after the inserted/deleted frame, whose partial redundant copy is valid for a frame before the inserted/deleted frame.

The benefit of the fourth embodiment is the avoidance of quality degradations related to incorrect FEC offsets that may occur when a jitter buffer in a network node inserts or removes a frame.

Figure 4:
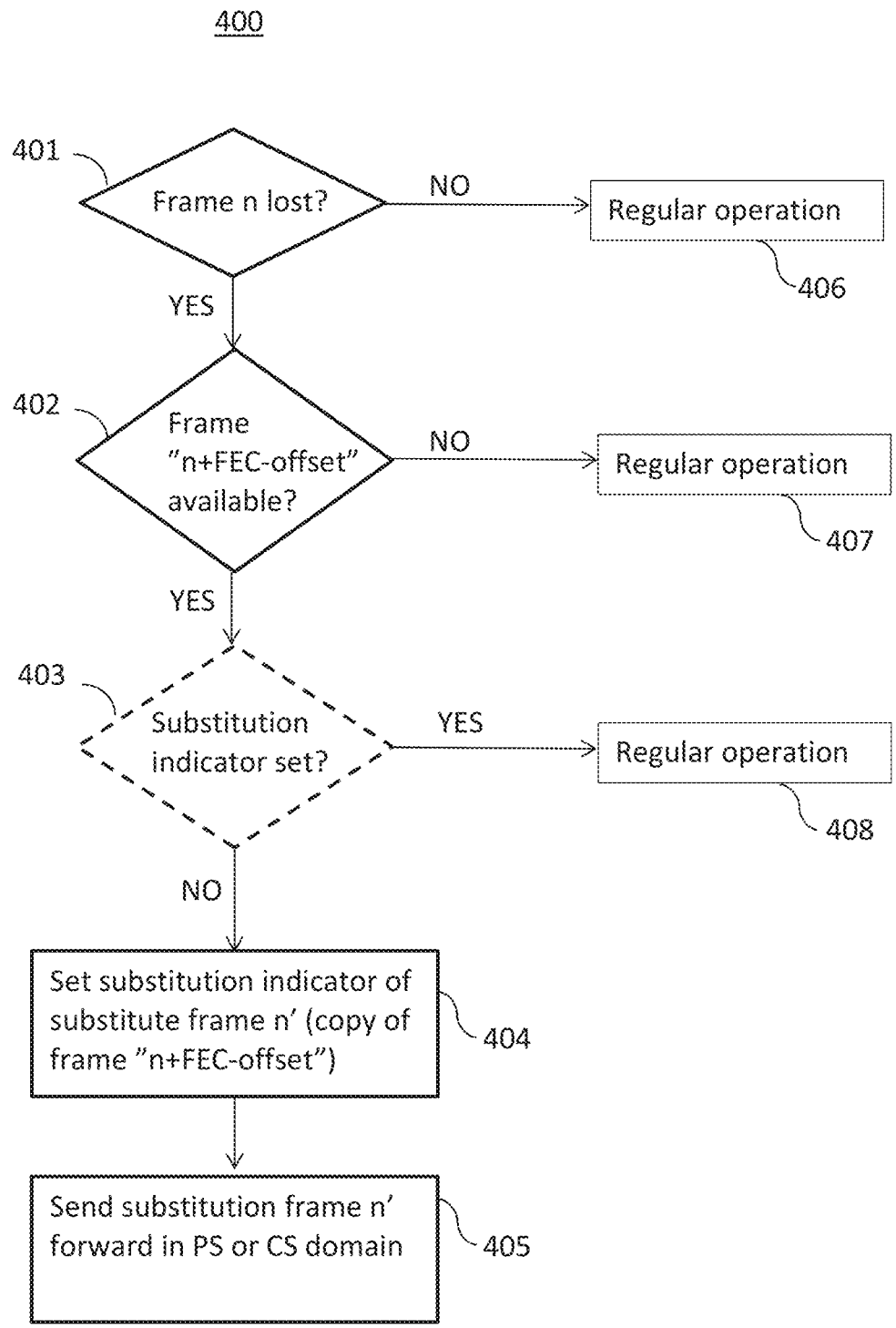
FIG. 4 is a flow chart showing an example of a method performed by/in network node comprising jitter buffer.
Figure 5:
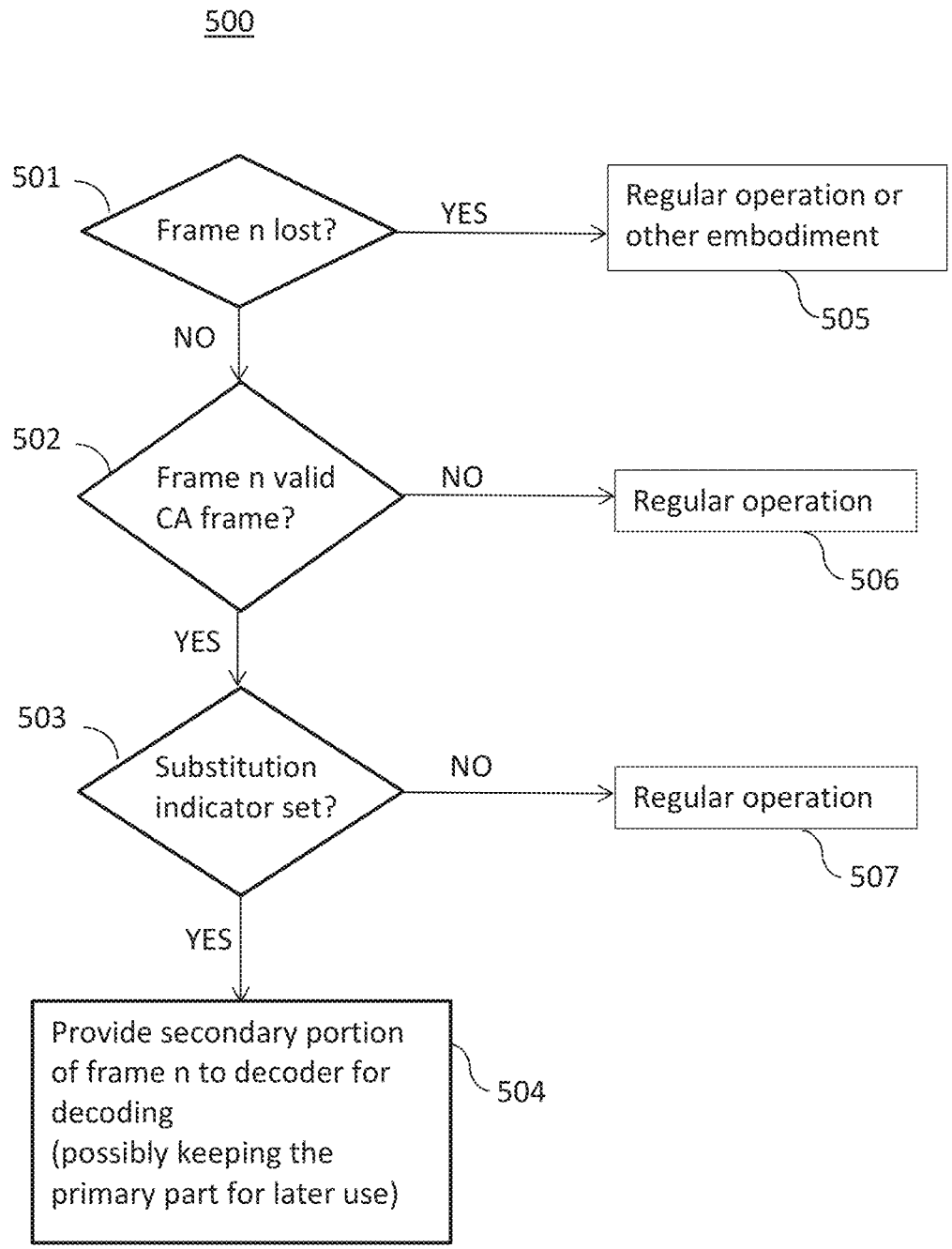
FIG. 5 is a flow chart showing a method performed by/in CS UE according to exemplifying embodiment.
Figure 6:
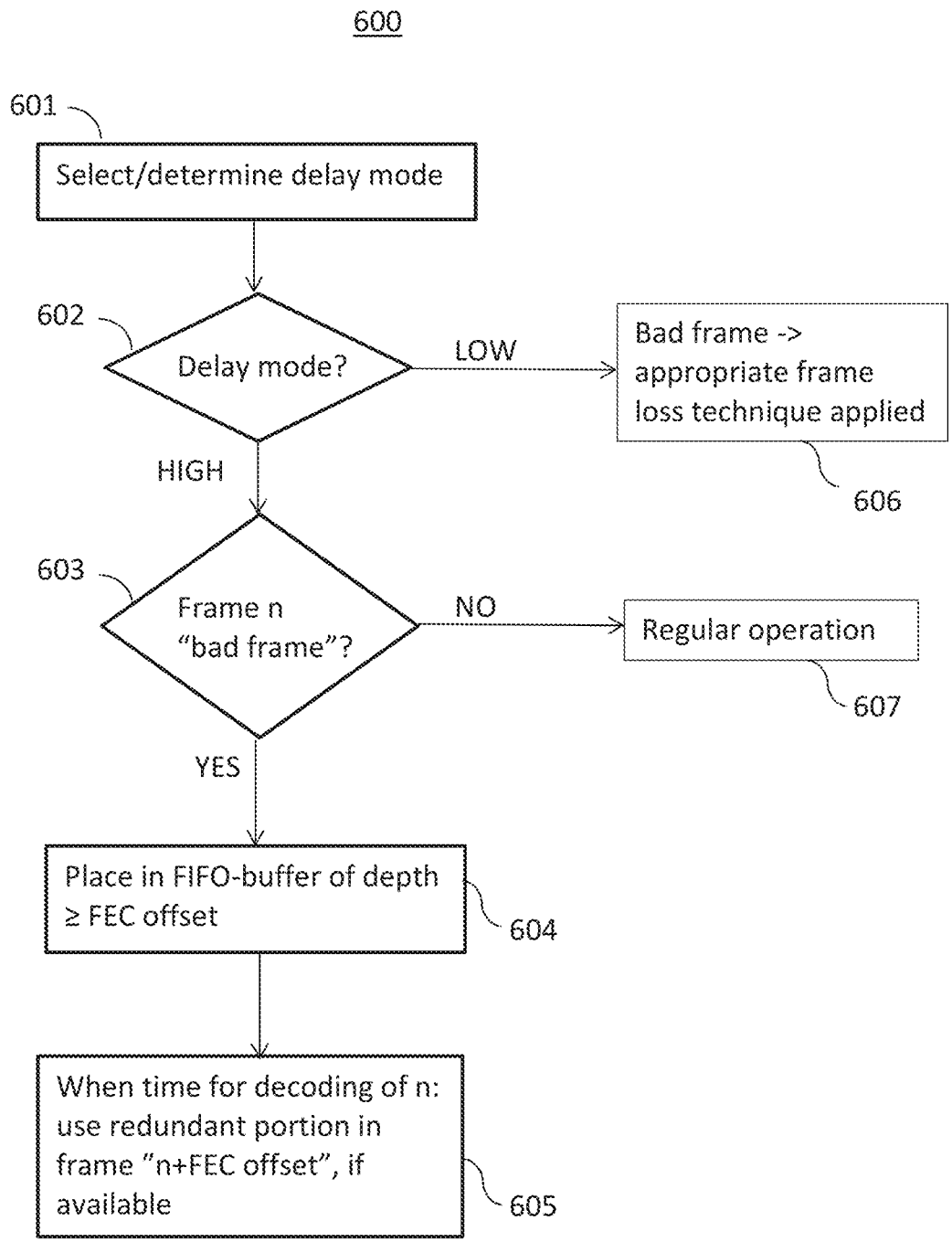
FIG. 6 is a flow chart showing a method performed by/in CS UE according to another exemplifying embodiment.

The above described embodiments are now discussed in more detail with references to flow charts of FIGS. 4-6.

Figure 2:
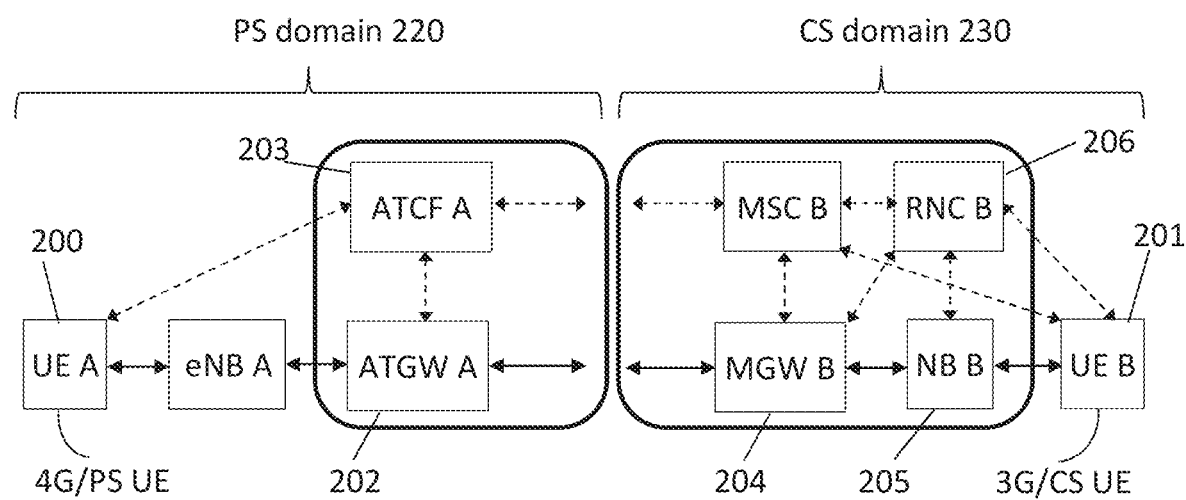
FIG. 2 shows a transcoding-free inter-connect scenario between a 4G-UE residing in PS domain and a 3G-UE residing in CS domain.
Figure 3:
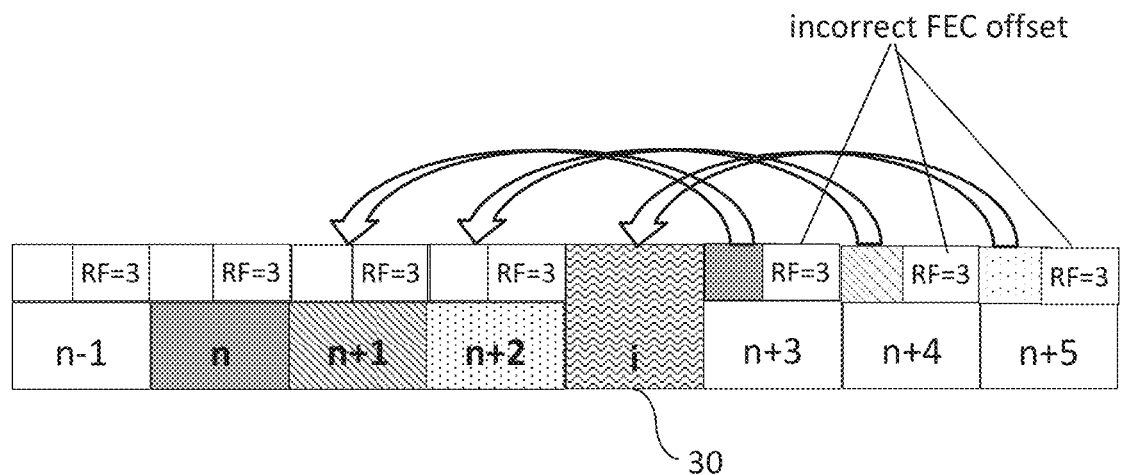
FIG. 3 illustrates a problem that occurs in case a JBM in a network node inserts or removes frames in order to re-adjust the depth.

The first embodiment for network nodes, e.g. such as the ATGW A 202 or MGW B 204 in FIG. 2, with EVS jitter buffer, will now be described in detail, partly with reference to FIG. 2. The description focuses on the typical case that the jitter buffer operation is based on EVS speech frames.

Analogue embodiments for the case that the jitter buffer operates with packets can be formulated.

It is assumed that the network node in question receives packets containing at least one frame of EVS CA mode encoded speech, i.e. the CA mode is activated in the direction 4G-UE to 3G-UE. The EVS packets from the 4G-UE A 200 arrive at that network node with delay jitter, possibly even out of order, and some of the packets may be lost and do not at all arrive at this network node or they arrive far too late. The JBM method of that network node places all received frames arrived within the packets, into the jitter buffer, at positions corresponding to increasing sequence numbers or increasing time stamps. The JBM algorithm also takes out the oldest frames at a constant rate of one frame every 20 ms and propagates, i.e. sends or otherwise provides, them to some transmission entity. The JBM algorithm may also make adaptations of the jitter buffer depth and may insert or discard frames upon buffer underrun or overflow, late arrival, packet loss, etc. or for reducing the speech path delay. This may be done according to any JBM algorithm, e.g. the one specified for the EVS-Codec in 3GPP TS 26.448. The transmission entity may either propagate the frames to a next node within RTP packets, if there is a PS link, or send the frames on a CS connection link to the next node. The network node with JBM may be an ATGW A 202, as illustrated in FIG. 2, and the next node may be MGW B 204. Alternatively, the network node comprising the JBM may be a MGW B 204, as illustrated in FIG. 2, transmitting the EVS frames on the CS Iu interface onwards to RNC (Radio Network Controller) B 206 and NB B 205.

Depending on the delay and loss statistics of the packets arriving at that network node and the adaptation decisions of the JBM, the jitter buffer may typically buffer several frames (e.g. 3 or 4) before they are propagated to the transmission entity. Thus, when the EVS CA mode frame n is due for propagation to the transmission entity, the jitter buffer may already contain the frame 'n+FEC offset' containing the partial redundant copy of frame n.

In that case and if frame n is unavailable when it is due for transmission, the solution according to the embodiments may be applied, e.g. by the JBM, the network node or by the transmission entity as follows. In the text below, to facilitate the description, it is assumed that a transmission entity performs some of the actions. This transmission entity could be regarded as a functional unit operable to, i.e. configured to, perform the actions.

FIG. 4 illustrates an exemplifying embodiment of method 400. In this embodiment it is assumed that frames are handled by the JBM and the transmission entity. Method 400 may comprise one or more of the following steps/actions.

In a first step/action 401 it is determined whether frame n is lost. If it is determined that frame n is not lost, the JBM propagates frame n to the transmission entity, which is illustrated as regular operation 406. If frame n is lost, the frame 'n+FEC offset' displaced by the FEC offset and containing the partial redundant copy of frame n is located in the jitter buffer, e.g. identified or found in the buffer and/or derived from the buffer. This is illustrated as action 402. If available, the frame 'n+FEC offset' is accessed by the transmission entity and copied e.g. to some working buffer. If the frame 'n+FEC offset' is not available, then the state-of-the-art handling of lost frames may be applied, which is illustrated as action 407.

In a next optional step/action a check may be performed whether the frame 'n+FEC offset' already contains a signal, herein denoted "substitution indicator", indicating that the primary data portion of the coded speech frame shall be ignored. This is illustrated as action 403. If the frame comprises a substitution indicator indicating that the primary portion should be ignored, this is an indication of that a preceding network node may already have carried out the method and hence, it needs to be avoided that the method is carried out a second time. Under this condition, state-of-the-art handling of lost frames may be applied for frame n and the procedure described here may exit, which is illustrated as action 408. Otherwise, the procedure continues with action 404.

Figure 8A:
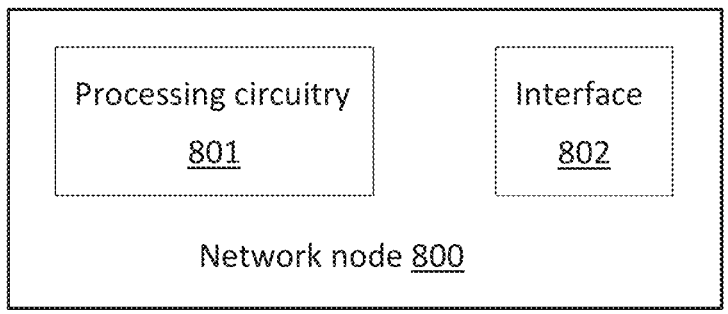
FIGS. 8A, 8B, and 8C illustrate different implementations of a network node according to exemplifying embodiments.
Figure 8B:
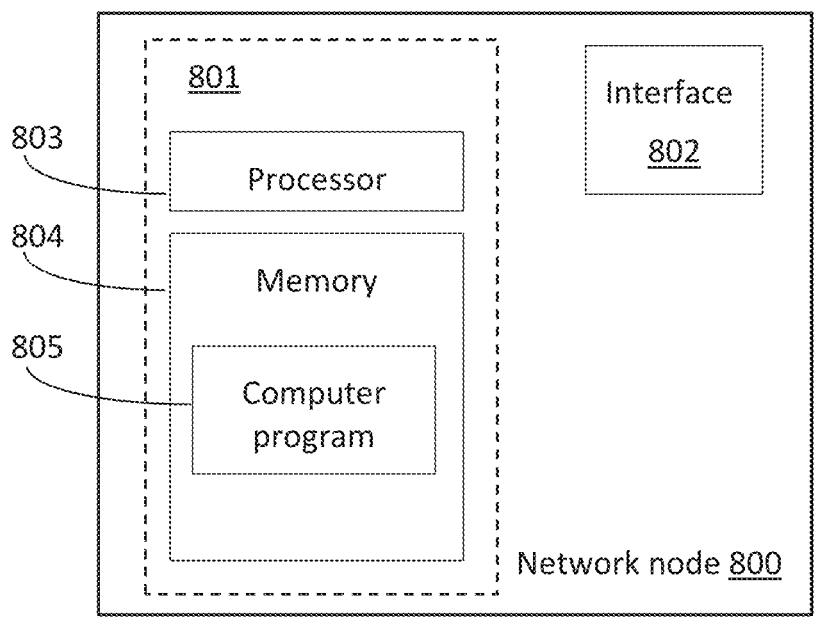
Figure 8C:
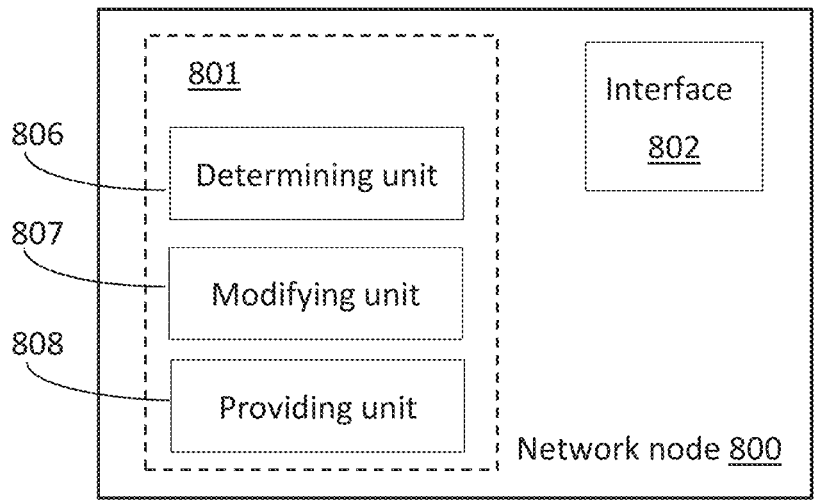

It is to be noted that this step/action 403 is optional and only required in case there is a theoretical possibility that there are two network nodes in the call path that employ jitter buffers with a depth at least as large as the FEC offset. In such a case the partial redundancy of a lost frame might be accessible in both jitter buffers and it might happen twice with a frame that it is used instead of a lost frame. The present step/action 403 enables avoiding of this possibility. Any or all of the actions described above may be executed by processing circuitry, e.g. by a determining unit, as illustrated in FIGS. 8A-C.

In a further step/action, the copied frame 'n+FEC offset', e.g. within the working buffer, is modified by adding the substitution indicator. This is illustrated as action 404. This signals/indicates that the primary data portion shall be ignored by the decoder of a 3G-UE, and rather the redundancy portion shall be used, when decoding and reconstructing frame n. This may be executed by processing circuitry, e.g. by a modifying unit, as illustrated in FIGS. 8A-C In another step/action the modified frame is sent onwards in the PS domain to the next network node, or is transmitted onwards on the CS connection link. This is illustrated as action 405. This may be executed by processing circuitry, e.g. by a providing unit, as illustrated in FIGS. 8A-C.

It might be, depending on the call scenario, that several frames are sent within one RTP packet and also RTP Redundancy may be used by the transmission entity. In case the frame is sent onwards within an RTP packet, it must be ensured that the packet has a suitable RTP packet header. One solution is that the RTP header of the packet is set such that it corresponds to the RTP header of the unavailable packet n. In particular, time stamp and/or sequence number are set accordingly. A disadvantage of this approach could be that it could affect packet loss and performance monitoring since the originally lost frame (or packet) n would appear as if it was not lost. A more preferred way is therefore to include the frame in another packet, e.g. in packet n−1. This is possible even if packet n−1 has already been sent when packet n is due. In particular, this means that packet n−1 would be resent with the redundancy frame n added. This solution would not impact potential packet loss and performance monitoring.

In an alternative embodiment it is assumed that packets (rather than frames) are handled by the JBM and the transmission entity. All steps/actions of the above procedure may apply in an analogue way.

According to the solution described herein, a substitution indicator is defined. There are several possibilities of how to define the substitution indicator. The purpose of this substitution indicator is to signal to the EVS decoder in a CS UE that the primary data portion of the frame shall be ignored and the redundancy portion is to be used instead, i.e. a secondary redundant part of a frame should be subjected to decoding by a 3G-UE, rather than a primary part. As described above, the substitution indicator may also indicate to a network node (comprising a jitter buffer) along the path of propagation of the frames that a frame has already been "replaced" by a substitution frame (according to the invention) by another network node, also comprising a jitter buffer.

One possibility is to use a unique bit pattern in the primary data portion. The primary data portion consists, depending on the redundancy frame type, of a varying number of bits, but at least 189 bits. Setting a fixed number of bits (e.g. 189 bits) of the primary data portion to a predetermined bit pattern ("CA-CodeWord"==e.g. all '1', all '0', or '010101 . . . 0') is a suitable signal. Assuming that all bit combinations are equally likely in a normal valid primary portion, this CA-CodeWord would unintendedly occur or happen with a likelihood of only $1.3*10^{-57}$. This means that it is practically excluded that the CA-CodeWord would occur by coincidence in a valid primary data portion.

Since there are so many bits left for the CA-CodeWord even several of such CA-Code Words could be defined, allowing some differentiation.

A further possible format of the substitution indicator is as follows, and depends on whether the transmission entity propagates the data to a next node in PS or CS domain. In case the next node is in PS domain and the transmission is done with RTP/UPD/IP packets, an unused code point of the frame type code space can be defined as substitution indicator. The RTP payload format of the EVS codec is defined in Annex A of 3GPP TS 26.445. It specifies a compact format without any payload header and a header-full format containing a frame type signaling byte. The frame type signaling code space contains various unused codepoints that could be used. The frame type index table of the header-full EVS RTP payload format for EVS primary modes is shown below. One possibility would be to use code "001101" that was reserved for future use. Another possibility is defining a signaling code e.g. "010000" where the currently unused bit is set to "1". Even a further possibility is "010100" for which the last 4 bits "0100" would be the same as for the normal (non channel-aware) 13.2 kbps EVS mode. This may be useful if in some future the EVS codec is extended by more channel-aware modes for the other EVS codec rates.

TABLE 1

Frame Type index when EVS mode bit = 0

| EVS mode bit (1 bit) | Unused (1 bit) | EVS bit rate | Indicated EVS mode and bit rate |
|---|---|---|---|
| 0 | 0 | 0000 | Primary 2.8 kbps |
| 0 | 0 | 0001 | Primary 7.2 kbps |
| 0 | 0 | 0010 | Primary 8.0 kbps |
| 0 | 0 | 0011 | Primary 9.6 kbps |
| 0 | 0 | 0100 | Primary 13.2 kbps |
| 0 | 0 | 0101 | Primary 16.4 kbps |
| 0 | 0 | 0110 | Primary 24.4 kbps |
| 0 | 0 | 0111 | Primary 32.0 kbps |
| 0 | 0 | 1000 | Primary 48.0 kbps |
| 0 | 0 | 1001 | Primary 64.0 kbps |
| 0 | 0 | 1010 | Primary 96.0 kbps |
| 0 | 0 | 1011 | Primary 128.0 kbps |
| 0 | 0 | 1100 | Primary 2.4 kbps SID |
| 0 | 0 | 1101 | For future use |
| 0 | 0 | 1110 | SPEECH_LOST |
| 0 | 0 | 1111 | NO_DATA |

In case the next node is in CS domain and the EVS frames are transmitted as such on a CS link like the Iu interface, the substitution indicator could be defined by extending the EVS frame by an additional signaling bit. This is, in CS domain, in addition to the 264 regular bits of an EVS channel-aware mode speech frame, a single additional signaling bit would be used. If e.g. this bit is set to "1", this would be the substitution indicator meaning that the primary data portion of the frame would be unusable and that rather the redundancy portion has to be used for decoding. This embodiment has a slight disadvantage compared to the embodiment using a CA-CodeWord in the primary data portion in terms of overhead for the extraneous signaling bit and in terms of robustness against transmission errors. An advantage is however, that the primary data portion is conveyed to the receiver, which may still be of use as will be explained further down.

It is to be noted that the transmission entity of a network node that receives EVS frames in RTP packets from a PS connection may have to convert the format of the substitution indicator to the one used on an outgoing CS link. This is not necessary in case the first signaling method with a CA-CodeWord in the EVS primary data portion is used.

FIG. 5 illustrates method 500 performed by 3G-UE/CS UE (or more generally a node terminating the user plane link and decoding the EVS payload, including a 4G-UE). One or more of the following steps may be part of method 500.

Figure 9A:
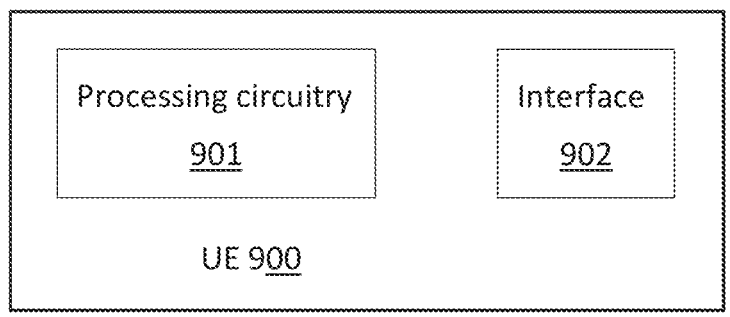
FIGS. 9A, 9B, and 9C illustrate different implementations of a UE according to exemplifying embodiments.
Figure 9B:
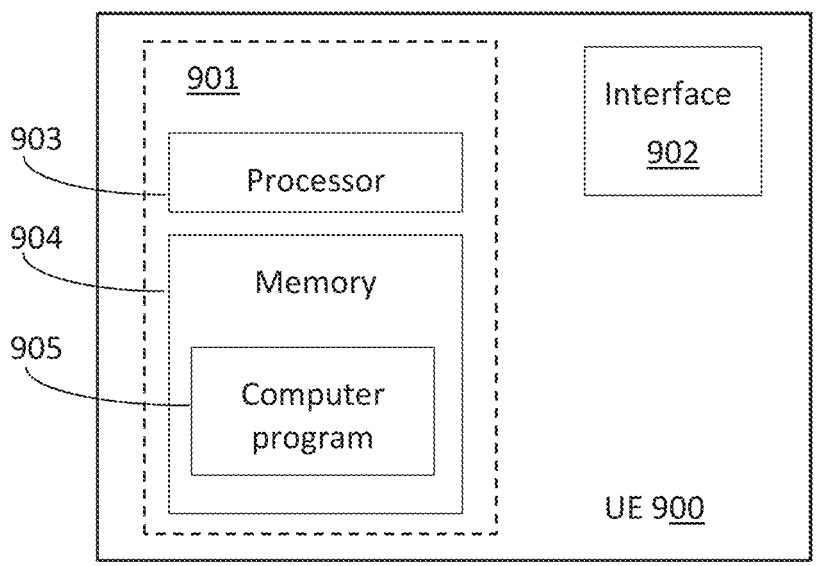
Figure 9C:
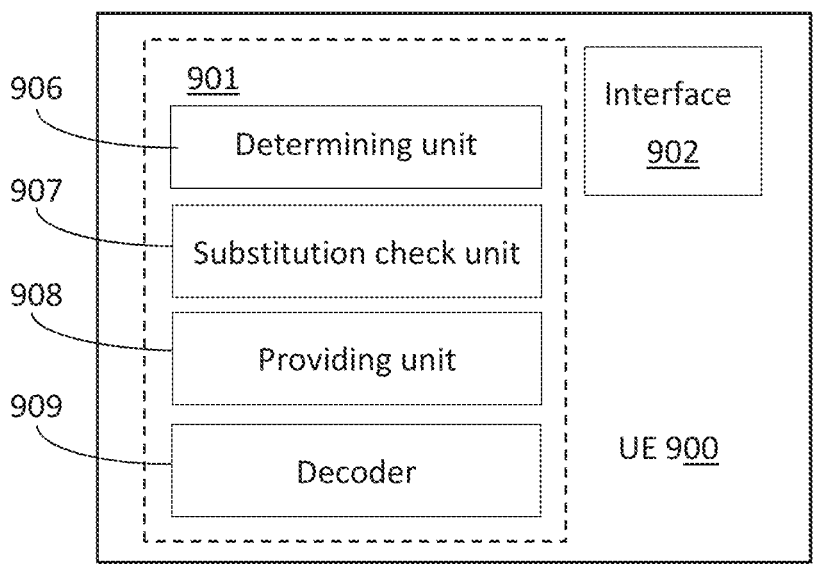

In a first step/action, it may be checked, if the received frame n is a valid EVS CA mode frame. In a CA mode frame an RF parameter is set indicating that mode; otherwise in a normal 13.2 kbps mode frame the RF parameter is not set. This is illustrated as action 502. If frame n is a valid CA mode frame, the method continues to action 503. Otherwise regular processing of frame n is performed in step 506. FIG. 5 also, for clarity, illustrates an action 501 where it is determined whether frame n is lost or not. If frame n is lost, method 500 exits with frame loss concealment, as shown in action 505. These actions may be executed by processing circuitry, e.g. by a determining unit, as illustrated in FIGS. 9A-C.

Then, the substitution indicator may be checked, wherein the substitution indicator indicates whether the primary frame portion or the redundancy portion should be used for decoding of the current frame n. This is illustrated as action 503. This action may be executed by processing circuitry, e.g. by a substitution check unit, as illustrated in FIGS. 9A-C.

If the substitution indicator is defined as a CA-CodeWord, then it is checked, if the CA-CodeWord is present in the respective (primary) bits.

If the substitution indicator is defined as additional signaling bit on top of a regular EVS CA mode speech frame, then it is checked, if this bit is set or not, where "set" may be that the bit is "1" instead of "0".

If the substitution indicator is defined as an unused code point in the EVS payload header, then it is checked if the corresponding bits are set.

If the substitution indicator is found/set for a frame, i.e. indicating that the received frame n is a substitution frame, then the redundancy portion of that frame is passed to the decoder for decoding of the present frame n. This is illustrated as action 504. This action may be executed by processing circuitry, e.g. by a providing unit, as illustrated in FIGS. 9A-C. Otherwise the primary portion is used (the majority case), which is illustrated as action 507.

In case the substitution indicator is not the CA-CodeWord, e.g. if an additional signaling bit is used in addition to the speech frame bits, the primary data portion of a substitution frame n contains valid coded speech data for frame 'n+FEC offset'. This means that the frame that will arrive FEC offset frames later will contain this primary data portion. A preferred embodiment enhancing frame loss robustness is hence to save the primary data portion for frame 'n+FEC offset' if it is obtained with a substitution frame for frame n. In case frame 'n+FEC offset' does not arrive, or arrives with an error, the saved primary data portion of that frame can instead be used and be fed to the speech decoder.

FIG. 6 illustrates a further aspect of the embodiment performed in/by a 3G-UE/CS-UE (or more generally a node terminating the user plane link and decoding). A method 600 of handling of bad frames is shown when the EVS CA mode is in use. For this solution, the UE can be configured to operate in two delay modes. In a low delay mode, a received speech frame is essentially immediately after reception (and respecting the necessary process scheduling) passed to the decoder for decoding and speech reconstruction.

The selecting or determining of which mode to use is illustrated as action 601, and also action 602 illustrates the forking into different processings depending on which delay mode is applied.

If the frame is marked as bad frame, e.g. due to a detected transmission error or a frame/packet loss anywhere in the speech transmission path, then for the low delay mode the respective frame loss concealment technique of the speech decoder is used. This is illustrated as action 606. If, however, the UE operates in a high delay mode, then the received speech frame is placed into a first in first out (FIFO) buffer, with depth of at least the FEC offset of the CA mode. This is illustrated as action 604. At each time instant, when the speech decoder requires a frame of coded speech data for decoding, the oldest frame is taken out of the FIFO buffer and passed to the speech decoder. In case frame n out of the FIFO is this oldest frame and due to be passed to the speech decoder, it is checked if it is a good frame. If yes, it is passed to the decoder for decoding and reconstruction of the frame. If not, the frames in the FIFO are scanned, if there is a frame that is good and which partial redundancy data belongs to frame n. If the redundancy frame is within the buffer, then it is checked, if the redundancy information is valid. If yes, then this redundancy information is used for decoding. This is illustrated as action 605 in FIG. 6. Otherwise the state-of-the-art error concealment is performed. The embodiment illustrated in FIG. 6 shows the determining of whether a frame is "good" or "bad" as an action 603 before the placing of the frame in a buffer. Action 607 illustrates regular operation in case of a good frame. This is, however only an example.

A further embodiment, which may be used in combination with the other embodiments, relates to a problem that occurs in case a JBM in a network node inserts or removes frames in order to re-adjust the jitter buffer depth. The solution is related to detecting an insertion or deletion condition and to modifying the RF frame offset parameter of those frames after the inserted/deleted frame, whose partial redundant copy is valid for a frame before the inserted/deleted frame. In case the JBM has inserted a frame between the frame carrying the primary copy and the frame carrying the redundant copy, the FEC offset parameter of the frame carrying the redundant copy is increased by one. In the opposite case, if the JBM has deleted a frame between the frame carrying the primary copy and the frame carrying the redundant copy, the FEC offset parameter of the frame carrying the redundant copy is decreased by one.

Figure 7:
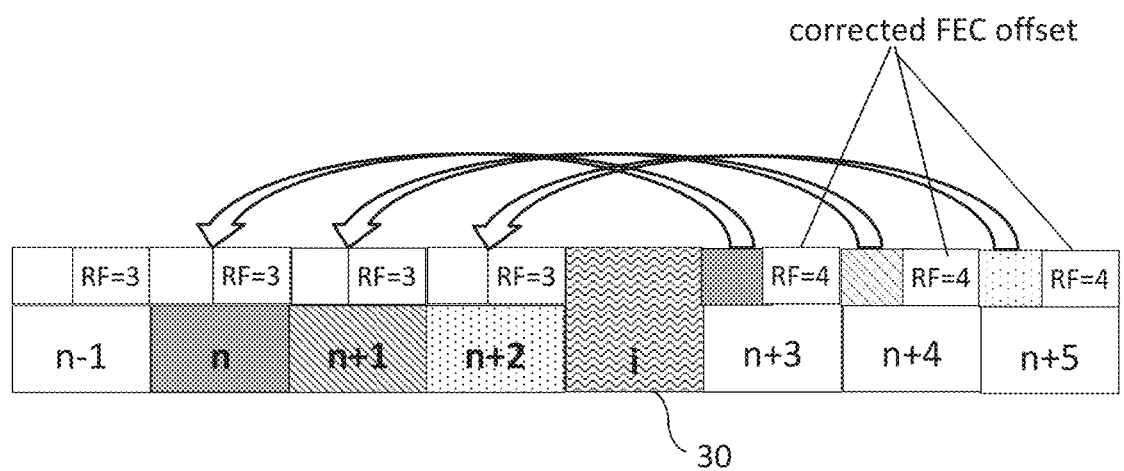
FIG. 7 illustrates an example solution for a problem that occurs in case a JBM in a network node inserts or removes frames in order to re-adjust the depth.

This solution is illustrated in FIG. 7. In the example of FIG. 7 the JBM method in the network node has inserted frame 'i' 30. This has the consequence that the original FEC offset parameters (RF=3), contained in frames n+3, n+4, and n+5 are incorrect. The solution is to correct the parameters to the value of RF=4.

A complication is that the FEC offset signaling space is limited. In the current EVS standard the FEC offset parameter (RF) is encoded with two bits, allowing the representation of FEC offset values 2, 3, 5, and 7. An example solution of this problem is the extending the EVS frame by an additional signaling bit. This is, in CS domain, in addition to the 264 regular bits of an EVS channel-aware mode speech frame (and other possibly added signaling bits), a further additional signaling bit would be used. If e.g. this bit is set to "1", the coding of the FEC offset parameter (RF) bits would be changed from 2,3,5,7 to 1,4,6,8. If the bit is 0 or not present, the original coding (2,3,5,7) would remain. In case the frames are transported in RTP packets, an unused code point (e.g. "011101") of the Frame Type index table (see Table 1 above) could be used to signal that a frame of the EVS CA 13.2 kbps mode is contained in the RTP packet and that the coding of the FEC offset parameter (RF) bits is changed from 2,3,5,7 to 1,4,6,8.

Even if the signaling space could not be extended by an additional signaling bit or an additional code point in the frame type index table, the solution would work for single frame insertions by the JBM when the CA mode is operated with an FEC offset of 2 and for single frame deletions by the JBM when the CA mode is operated with an FEC offset of 3.

Embodiments described herein may comprise one or more of the following features, which could be performed in any suitable or appropriate order:

A Network node or functional unit may e.g.: comprise a jitter buffer; obtain a number of frames; determine whether a frame n is lost or e.g. is erroneous; determine whether a frame "n+FEC offset" is present in the jitter buffer; determine whether CA-mode is or should be applied; determine whether a substitution indicator is present and/or set for a frame "n+FEC offset" and take action in accordance with this; create a substitute frame "n'", based on the frame "n+FEC offset", substituting the lost or erroneous frame n; set a substitution indicator for the substitute frame n', thus indicating that a primary part of the frame is irrelevant or should be ignored in view of decoding; propagate or send the substitute frame onwards in the PS domain or into the CS domain, e.g. in case the node is on the border towards a CS domain; detect an insertion or deletion of a frame; modify an "RF frame offset" parameter of frames after an inserted/deleted frame; adjusting an FEC offset parameter of frames; e.g. after an inserted/deleted frame.

A UE or functional unit may e.g.: determine whether a frame n is lost or erroneous; determine whether a frame n is a valid EVS CA-mode frame; determine whether a substitution indicator is present and/or set for a frame n, (if it is, the frame is a substitute frame n'); provide redundancy portion of frame n (n') to a decoder for decoding; keep primary part of frame n (n') for later use; be operational in two different delay modes, one having a "low" delay, and one having a "high" delay which is higher than the "low" delay, and which is equal to or higher than the FEC offset; select one of the two delay modes; determine which of the two delay modes that is or should be applied; determine or detect whether a frame n is a so-called "bad" frame, e.g. is erroneous in some way; comprise a buffer having a depth equal to or exceeding FEC-offset; place one or more obtained frames in the buffer having a depth equal to or exceeding FEC-offset; determine whether a frame "n+FEC offset" is present in the buffer; provide secondary portion of frame "n+FEC offset" to a decoder for decoding.

The methods and techniques described above may be implemented in network nodes and/or UEs. Above, in association with describing the method embodiments, it is exemplified in which nodes in communication system the methods are intended to be implemented. Corresponding nodes in other communication systems may be denoted differently than the nodes described above.

An exemplifying embodiment of a network node, such as an ATGW or MGW described above, is illustrated in a general manner in FIG. 8A. The network node 800 could be e.g. an ATGW or MGW, as illustrated in FIG. 2. The network node 800 is configured to perform at least one of the method embodiments described above with reference to any of FIGS. 4-6. That is, the network node 800 may be configured to perform a method according to a perspective of one network node involved in the different embodiments described above. The network node 800 may be assumed to be associated with the same technical features, objects and advantages as the previously described method embodiments. The node will be described in brief in order to avoid unnecessary repetition.

The network node may be implemented and/or described as follows:

The network node 800 may comprise processing circuitry 801 and a communication interface 802. The processing circuitry 801 is configured to cause the network node 800 to perform actions associated with any of the method embodiments described above. The communication interface 802, which may also be denoted e.g. Input/Output (I/O) interface, may include a network interface for sending data to and receiving data from other network nodes.

The processing circuitry 801 could, as illustrated in FIG. 8B, comprise processing means, such as a processor 803, e.g. a CPU, and a memory 804 for storing or holding instructions. The memory would then comprise instructions, e.g. in form of a computer program 805, which when executed by the processing means 803 causes the network node 800 to perform any of the actions described above.

An alternative implementation of the processing circuitry 801 is shown in FIG. 8C. The processing circuitry here comprises functional units, such as a determining unit 806, configured to cause the network node e.g. to determine whether a frame is lost, and/or whether a frame 'n+FEC offset' is present in a jitter buffer. The processing circuitry may further comprise e.g. a modifying unit 807, configured to cause the network node e.g. to determine whether a substitution indicator is set for the frame 'n+FEC offset' and/or to set the substitution indicator in the case a substitution frame, e.g. n', is created from the frame 'n+FEC offset'. The processing circuitry may further comprise a providing unit 808, configured to cause the network node to provide e.g. the substitution frame n' to other nodes or entities in the PS or CS domain. The units 806-808 are here illustrated as different units, but could alternatively be one unit configured for these tasks. The processing circuitry could comprise more units, and actions or tasks could alternatively be performed by one of the other units.

The network node(s) described above could be configured for the different method embodiments described herein. The network node 800 may be assumed to comprise further functionality, for carrying out regular node functions.

An exemplifying embodiment of a UE, such as a 3G-UE or CS-UE described above, is illustrated in a general manner in FIG. 9A. The UE 900 could be e.g. the UE B illustrated in FIG. 2. The UE 900 is configured to perform at least one of the method embodiments described above with reference e.g. to any of FIGS. 5-6. That is, the UE 900 may be configured to perform a method according to a perspective of one UE involved in the different embodiments described above. The UE 900 may be assumed to be associated with the same technical features, objects and advantages as the previously described method embodiments. The UE will be described in brief in order to avoid unnecessary repetition.

The UE may be implemented and/or described as follows:

The UE 900 may comprise processing circuitry 901 and a communication interface 902. The processing circuitry 901 is configured to cause the UE 900 to perform actions associated with any of the method embodiments described above. The communication interface 902, which may also be denoted e.g. Input/Output (I/O) interface, may include a network interface for sending data to and receiving data from network nodes and/or other UEs.

The processing circuitry 901 could, as illustrated in FIG. 9B, comprise processing means, such as a processor 903, e.g. a CPU, and a memory 904 for storing or holding instructions. The memory would then comprise instructions, e.g. in form of a computer program 905, which when executed by the processing means 903 causes the UE 900 to perform any of the actions described above.

An alternative implementation of the processing circuitry 901 is shown in FIG. 9C. The processing circuitry here comprises functional units, such as a determining unit 906, configured to cause the UE to determine e.g. whether a frame is lost, and/or whether a frame is a valid EVS CA-frame. The processing circuitry may further comprise e.g. a substitution check unit 907, configured to cause the UE e.g. to determine or check whether a substitution indicator is set for the frame. The processing circuitry may further comprise a providing unit 908, configured to cause the UE to provide e.g. the redundancy portion of the frame to a decoder. The processing circuitry may naturally also comprise a decoder 909, such as an EVS decoder. The units 906-909 are here illustrated as different units, but could alternatively be one unit configured for these tasks. The processing circuitry could comprise more units, and actions or tasks could alternatively be performed by one of the other units.

The UE(s) described above could be configured for the different method embodiments described herein. The UE 900 may be assumed to comprise further functionality, for carrying out regular UE functions.

Within the context of this disclosure, the term "UE" encompasses any type of wireless node which is able to communicate with a network node or with another wireless node or device by transmitting and/or receiving wireless signals. In relevant cases for the solution described herein, a UE could be regarded as a node terminating the user plane link and decoding the EVS payload. The solution described herein has a CS aspect, but a UE could also be capable of communicating in 4G PS networks. Thus, the term "UE" encompasses, but is not limited to: a mobile terminal, a tablet, a smartphone, a stationary or mobile wireless device for machine-to-machine communication, an integrated or embedded wireless card, an externally plugged in wireless card, a dongle, etc. Whenever a "UE" is referred to in this disclosure, this should be understood as encompassing any wireless device as defined above. A UE may be equipped with a screen, button and speaker, but such features are not required to be present for the operation of any of the embodiments presented herein.

It should be noted that although terminology from 3GPP has been used in this disclosure to exemplify the invention, this should not be seen as limiting the scope of the invention to only the aforementioned system. Other which support contemporaneous connections with two or more wireless access points, e.g. dual connectivity, may also benefit from exploiting the ideas covered within this disclosure.

The methods described herein could be performed in a distributed manner, i.e. different actions could be performed in different locations in the network, e.g. in a so-called cloud solution, or a "Centralized RAN" or "Split Architecture", where e.g. a node is divided into 2 or more separate nodes. Correspondingly, the methods could be performed e.g. partly in a radio access node and partly in a core network node. The distributed case could be described as that the method is performed by an arrangement or by a network node, where the arrangement or the network node could be distributed in the network, and not necessarily be comprised in a physical unit.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes. At least part of the software could be stored and/or executed locally in a physical node, or in a logical node, e.g. distributed in the network. At least part of the software could be stored and/or executed, e.g. in a node or entity in a so-called cloud solution.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

It should be noted that although terminology from 3GPP LTE has been used in this disclosure to exemplify the invention, this should not be seen as limiting the scope of the invention to only the aforementioned system. Other wireless systems which support a broadcast service may also benefit from exploiting the ideas covered within this disclosure.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method for obtaining audio frames from a circuit-switched communication link for decoding, the method comprising:
    receiving an audio frame comprising a primary portion and a redundancy portion, wherein the redundancy portion of the received audio frame comprises a partial redundant copy of a previous frame that is offset by k frames, k being an integer not equal to zero;
    determining whether a substitution indicator of the audio frame is set; and
    providing the redundancy portion of the audio frame to a decoder for decoding as a result of determining that the substitution indicator is set, otherwise providing the primary portion of the audio frame to the decoder for decoding.

2. The method of claim 1, wherein the substitution indicator is a signaling bit within the audio frame.

3. The method of claim 1, further comprising determining whether the received frame is an EVS channel-aware mode frame.

4. The method of claim 1, wherein the method is performed by a user equipment associated with a circuit switched network.

5. The method of claim 1, further comprising storing the primary portion of the audio frame as representation of the primary portion of frame n+k if the substitution indicator indicates the audio frame as a substitution frame.

6. The method of claim 5, further comprising determining whether frame n+k is unavailable or erroneous.

7. The method of claim 6, further comprising providing the stored primary portion to the decoder for decoding as a result of determining that frame n+k is unavailable or erroneous.

8. The method of claim 1, wherein the method is performed by a node terminating the user plane link in a circuit switched network.

9. The method of claim 1, wherein the method is performed by a user equipment.

10. An apparatus comprising a processor and a memory, the memory containing instructions executable by the processor whereby the apparatus is configured to:
receive an audio frame comprising a primary portion and a redundancy portion, wherein the redundancy portion of the received audio frame comprises a partial redundant copy of a previous frame that is offset by k frames, k being an integer not equal to zero;
determine whether a substitution indicator of the audio frame is set; and
provide the redundancy portion of the audio frame to a decoder for decoding as a result of determining that the substitution indicator is set, otherwise provide the primary portion of the audio frame to the decoder for decoding.

11. The apparatus of claim 10, wherein the substitution indicator is a signaling bit within the audio frame.

12. The apparatus of claim 10, further being operative to check if the received frame is an EVS channel-aware mode frame.

13. The apparatus of claim 10, wherein the apparatus is a user equipment associated with a circuit switched network.

14. The apparatus of claim 10, wherein the apparatus is comprised in a user equipment.

15. The apparatus of claim 10, wherein the apparatus is a node terminating the user plane link in a circuit switched network.

16. A computer program product comprising a non-transitory computer readable medium storing a computer program for performing a process comprising the steps of:
determining, based on a received audio frame comprising a primary portion and a redundancy portion comprising a partial redundant copy of a previous frame that is offset by k frames, k being an integer not equal to zero, whether a substitution indicator of the received audio frame is set; and
providing the redundancy portion of the audio frame to a decoder for decoding as a result of determining that the substitution indicator is set, otherwise providing the primary portion of the audio frame to the decoder for decoding.

* * * * *